United States Patent
Ishioka et al.

(10) Patent No.: US 7,343,087 B2
(45) Date of Patent: Mar. 11, 2008

(54) DATA STREAM PLAYBACK DEVICE AND METHOD, DIGITAL BROADCAST RECEIVER AND RELATED COMPUTER PROGRAM

(75) Inventors: Toshiyuki Ishioka, Takatsuki (JP); Tsutomu Sekibe, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 880 days.

(21) Appl. No.: 10/702,840

(22) Filed: Nov. 6, 2003

(65) Prior Publication Data
US 2004/0141731 A1    Jul. 22, 2004

(30) Foreign Application Priority Data
Nov. 12, 2002  (JP) .............................. 2002-328405

(51) Int. Cl.
H04N 5/00     (2006.01)
(52) U.S. Cl. .................. 386/124; 386/68; 386/131; 386/46
(58) Field of Classification Search ............... 386/68, 386/69, 120–121
See application file for complete search history.

(56) References Cited

U.S. PATENT DOCUMENTS

| | | | |
|---|---|---|---|
| 6,980,594 B2* | 12/2005 | Wang et al. ........... 375/240.12 |
| 2002/0136205 A1 | 9/2002 | Sasaki | |
| 2002/0154694 A1* | 10/2002 | Birch ..................... 375/240.05 |
| 2003/0021346 A1* | 1/2003 | Bixby et al. ........... 375/240.25 |

FOREIGN PATENT DOCUMENTS

JP    H08-102908    4/1996

* cited by examiner

*Primary Examiner*—Thai Q. Tran
*Assistant Examiner*—Helen Shibru

(57) ABSTRACT

When advance prediction is conducted for overflows and underflows, which are both types of buffer errors, and the occurrence of a buffer error is predicted, frames that a viewer will be unlikely to notice even if playback is omitted or conducted for a different duration from a predetermined standard duration are omitted or played for a different playback duration.

24 Claims, 9 Drawing Sheets

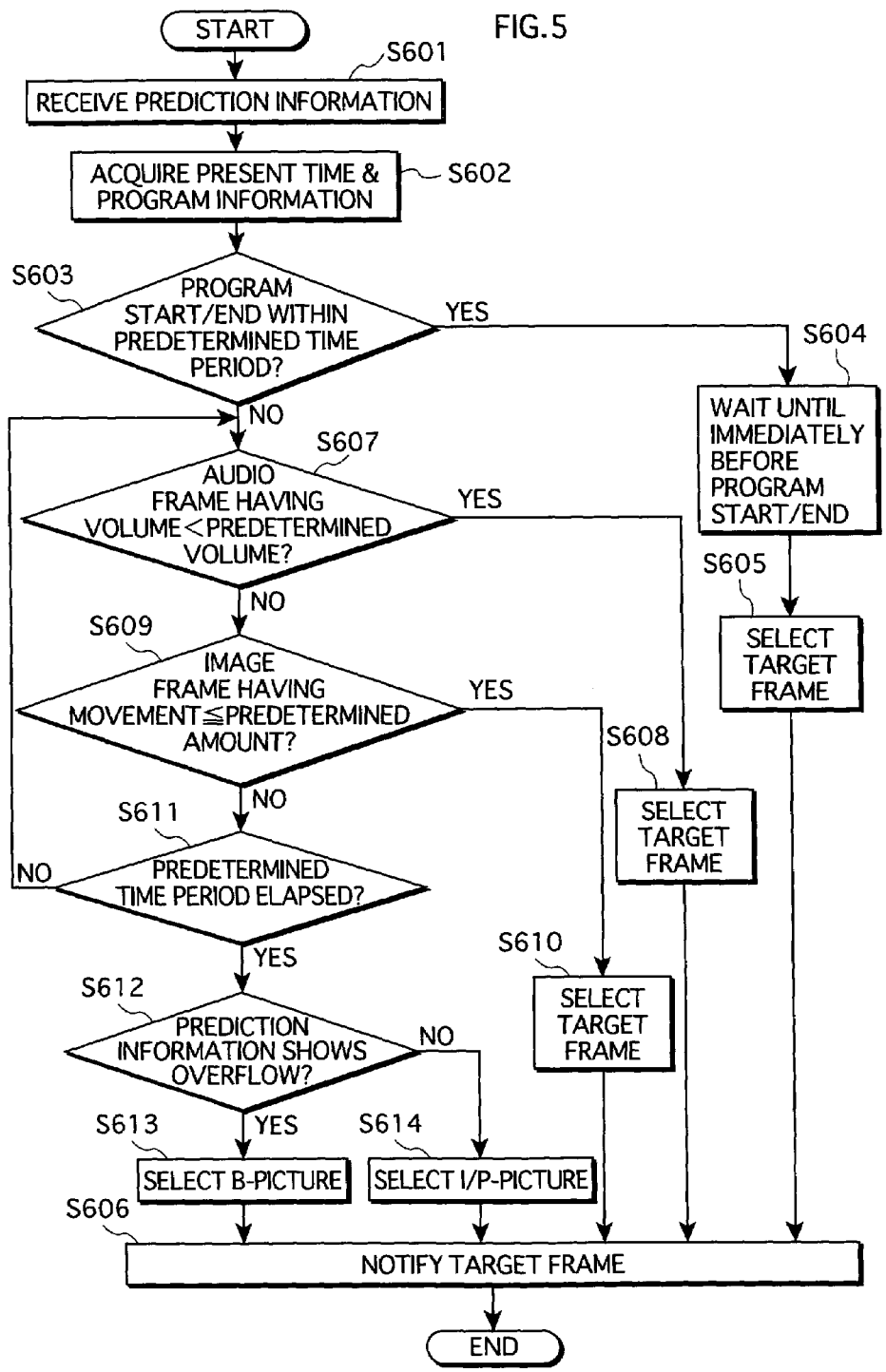

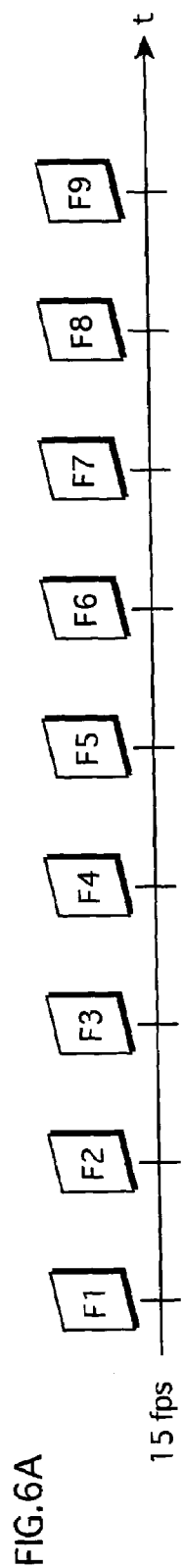
FIG.6A  15 fps
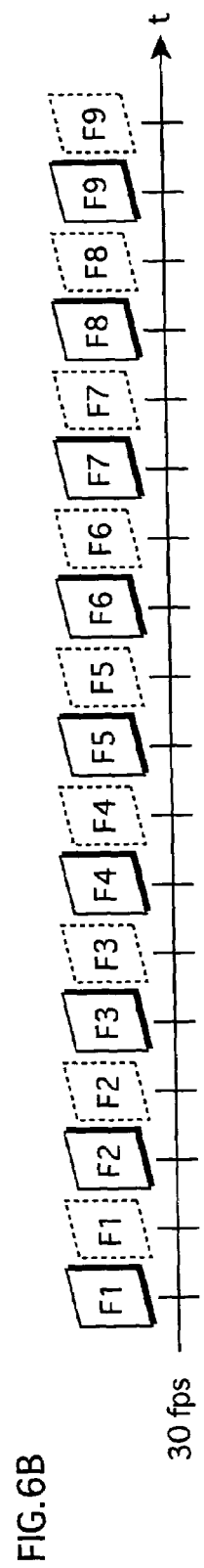
FIG.6B  30 fps

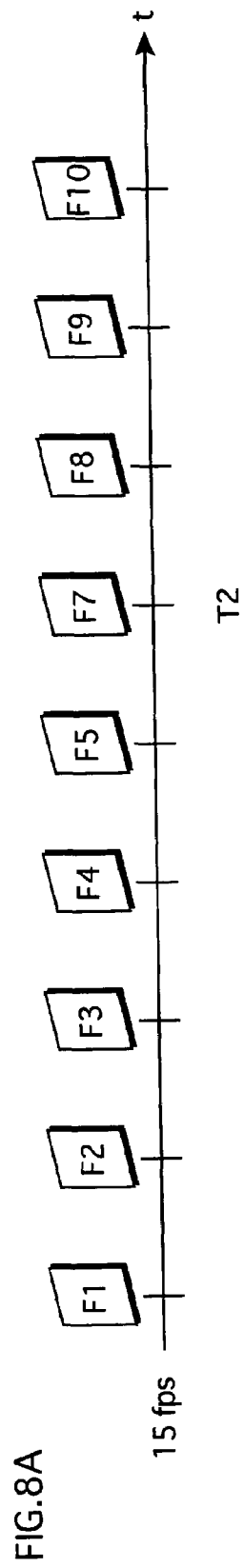
FIG. 8A
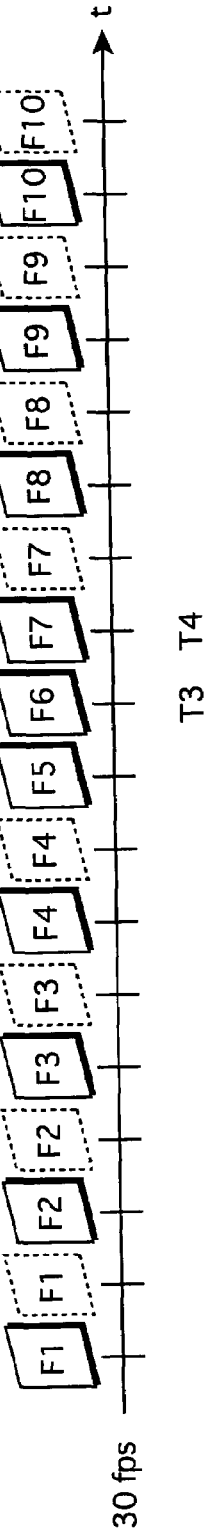
FIG. 8B
FIG.8

DATA STREAM PLAYBACK DEVICE AND METHOD, DIGITAL BROADCAST RECEIVER AND RELATED COMPUTER PROGRAM

This application is based on application no. 2002-328405 filed in Japan, the content of which is hereby incorporated by reference.

BACKGROUND OF THE INVENTION

1. Field of the Invention

The present invention relates to technology for playing data streams that include video and audio data, particularly technology that omits the adjustment of a reference clock used in video and audio playback.

2. Related Art

In recent years MPEG-2 (Moving Picture Experts Group 2) has become widely used as an encryption method for moving image signals in digital television broadcasts and the like.

MPEG-2 standards stipulate a transport stream (TS) used in broadcasts and so forth as a data stream.

An encoder encodes, according to MPEG-2 video/audio encoding standards, audio or video constituting a program to create an elementary stream (ES).

The encoder then divides the elementary stream into decode/playback units (single frames for video, single audio frames for audio) based on MPEG-2 standards, and appends a header that includes a decoding time stamp (DTS) showing a decoding time and a presentation time stamp (PTS) showing a playback time to each decode/playback unit, to create packetized elementary stream (PES) packets.

The encoder divides the PES packets into 184-byte units and appends a 4-byte header to create 188-byte TS packets. The encoder time-division multiplexes TS packets relating to one or a plurality of programs to create a transport stream.

The encoder multiplexes program specific information (PSI) onto transport streams. PSI is organized in a table format stipulated by MPEG standards, and includes program information such as program title, starting time and ending time, and information showing which packets to extract and how to decode extracted packets when arbitrary programs are selected for playback from a plurality of multiplexed programs.

A decoder, in the opposite order to the encoder, creates TS packets from inputted transport streams, and creates PES packets from the TS packets.

The decoder counts a system time clock (STC), being a synchronous signal used in the decoding/playback of video and audio, in sync with a 27-MHz clock provided in the decoder, and decodes decode/playback units when the DTS of respective decode/playback units matches the STC value.

The decoder outputs (i.e. plays) decode/playback units when the PTS of respective decode/playback units matches the STC value.

When there is a discrepancy between the frequencies of clocks used respectively by the encoder and decoder as a basis for encoding and decoding, inconsistencies arises between the amounts of a data stream inputted to and processed by the decoder per unit time. This causes underflows or overflows, both types of buffer errors, in buffers for holding the inputted amount of the data stream, which may in turn result in frame freeze whereby the same frame is played two or more times, or frame skipping whereby frames that should be played are not (see *Interface*, CQ publishing, January 2000, p.117).

To avoid these inconsistencies, the decoder uses a phase lock loop (PLL) circuit, which is a type of closed feedback circuit constituted by a phase comparator, a low-pass filter, a voltage control oscillator and so forth, to bring the clock frequency of the decoder in line with the clock frequency of the encoder (see *The Latest on MPEG*, edited by the Multimedia Communications Research Group, ASCII Publishing, Dec. 21, 1995, pp.235-238).

Program clock references (PCRs), which are pieces of time information for adjusting the decoder clock frequency to a frequency intended by the encoder, are appended intermittently in transport streams. Every time a PCR is received, the decoder uses the PLL circuit to convert the difference between the PCR value and the STC value to a voltage. The decoder increases or decreases the clock frequency of the decoder in response to the voltage, thereby obtaining the clock frequency intended by the encoder.

However, when decoder clock frequency adjustment by the PLL circuit lacks precision, or a fixed-frequency crystal oscillator not capable of frequency adjustment is used in place of the PLL circuit to reduce costs, for example, the above-mentioned inconsistencies between the amounts of a data stream inputted to and processed by the decoder per unit time occur. As mentioned above, this causes underflows or overflows in buffers for holding the inputted amount of the data stream, which may in turn result in the freezing or skipping of frames.

In view of these problems, the present invention aims to provide a serviceable data stream playback device that is capable of playing image and audio data in a state in which any deterioration in image or sound quality is reduced, even when adjusting for discrepancies between a clock of the decoder and a system clock of the encoder is not possible.

SUMMARY OF THE INVENTION

To resolve the above issues, a data stream playback device pertaining to the present invention, which receives a data stream that includes frame information, accumulates the frame information in a buffer, and reads from the buffer and plays the frame information, includes: a prediction unit operable to conduct prediction for a buffer error relating to an amount of frame information accumulated in the buffer; a selection unit operable, within a predetermined time period starting from when an occurrence of the buffer error is predicted, to select frame information, accumulated in the buffer, that satisfies a predetermined condition; and a playback unit operable to play the selected frame information using a playback rate different from a predetermined standard playback rate.

When the occurrence of a buffer error is predicted as a result of conducting advance prediction for buffer errors, the above structure allows for the amount of information accumulating in a buffer to be normalized by playing frames that a viewer is unlikely to notice, even when played irregularly, without relying on a predetermined standard playback rate. As a result, a data stream playback device pertaining to the present invention is able to play images or audio while reducing any deterioration in image/sound quality, even in cases of low PLL circuit performance or a low-cost structure that omits a PLL circuit.

Here, the buffer error may be an underflow indicating a shortage of frame information accumulated in the buffer, and the playback unit may play the selected frame information using a lower playback rate than the predetermined standard playback rate.

When the occurrence of an underflow is predicted as a result of conducting advance prediction for underflows, this structure allows for the reading and deleting of information from a buffer to be suppressed so as to normalize the amount of information accumulating in the buffer, by extending a predetermined playback duration of frames that a viewer is unlikely to notice even when played irregularly. As a result, it is possible to play images or audio while reducing any deterioration in image/sound quality, even in cases of low PLL circuit performance or a low-cost structure that omits a PLL circuit.

Here, the data stream may include time information, the data stream playback device may further include a clocking unit operable to count an internal clock, and an acquiring unit operable to acquire the time information from the data stream, and the prediction unit may predict the occurrence of the underflow based on a comparison of the time information and a count value counted by the clocking unit.

When the occurrence of an underflow is predicted as a result of conducting advance prediction for underflows using time information and a count value of an internal clock, this structure allows for the reading and deleting of information from a buffer to be suppressed so as to normalize the amount of information accumulating in the buffer, by extending a predetermined playback duration of frames that a viewer is unlikely to notice even when played irregularly. As a result, it is possible to play images or audio while reducing any deterioration in image/sound quality, even in cases of low PLL circuit performance or a low-cost structure that omits a PLL circuit.

Here, the prediction unit may calculate a differential between the count value and the time information, and predict that the underflow will occur if the differential is greater than or equal to a predetermined threshold.

When the occurrence of an underflow is predicted as a result of conducting advance prediction for underflows using a differential between time information and a count value of an internal clock, this structure allows for the reading and deleting of information from a buffer to be suppressed so as to normalize the amount of information accumulating in the buffer, by extending a predetermined playback duration of frames that a viewer is unlikely to notice even when played irregularly. As a result, it is possible to play images or audio while reducing any deterioration in image/sound quality, even in cases of low PLL circuit performance or a low-cost structure that omits a PLL circuit.

Here, the prediction unit may hold a first value and a second value, and whenever time information is acquired, may add "1" to the first value if the count value is greater than the time information, add "1" to the second value if the count value is smaller than the time information, and predict that the underflow will occur if the first value exceeds the second value by at least a predetermined threshold.

When the occurrence of an underflow is predicted as a result of conducting advance prediction for underflows based on a comparison of time information and a count value of an internal clock, this structure allows for the reading and deleting of information from a buffer to be suppressed so as to normalize the amount of information accumulating in the buffer, by extending a predetermined playback duration of frames that a viewer is unlikely to notice even when played irregularly. As a result, it is possible to play images or audio while reducing any deterioration in image/sound quality, even in cases of low PLL circuit performance or a low-cost structure that omits a PLL circuit.

Here, the prediction unit may predict that the underflow will occur if the amount of frame information accumulated in the buffer is less than or equal to a predetermined lower limit.

When the occurrence of an underflow is predicted as a result of conducting advance prediction for underflows using the amount of frame information accumulated in a buffer, this structure allows for the reading and deleting of information from a buffer to be suppressed so as to normalize the amount of information accumulating in the buffer, by extending a predetermined playback duration of frames that a viewer is unlikely to notice even when played irregularly. As a result, it is possible to play images or audio while reducing any deterioration in image/sound quality, even in cases of low PLL circuit performance or a low-cost structure that omits a PLL circuit.

Here, the frame information may be formed from image data, and the playback unit may play pieces of frame information having a consecutive playback order, after adjusting a scheduled playback duration of each piece so as to reduce a difference in length between the scheduled playback durations, if the difference is equal to or greater than a predetermined length of time.

When, in relation to a plurality of pieces of frame information for consecutive playback, the difference in lengths between the scheduled playback durations of the frames is greater than or equal to a predetermined length of time, this structure allows for any unnaturalness felt by a viewer to be minimized by reducing the difference in lengths.

Here, the buffer error may be an overflow indicating an excess of frame information accumulated in the buffer, and the playback unit may play the selected frame information using a higher playback rate than the predetermined standard playback rate or suppress playback of the selected frame information.

When the occurrence of an overflow is predicted as a result of conducting advance prediction for overflows, this structure allows for the reading and deleting of information from a buffer to be expedited so as to normalize the amount of information accumulating in the buffer, by either shortening the predetermined playback duration of frames that a viewer is unlikely to notice even when played irregularly or suppressing playback of these frames. As a result, it is possible to play images or audio while reducing any deterioration in image/sound quality, even in cases of low PLL circuit performance or a low-cost structure that omits a PLL circuit.

Here, the data stream may include time information, the data stream playback device may further include a clocking unit operable to count an internal clock, and an acquiring unit operable to acquire the time information from the data stream, and the prediction unit may predict the occurrence of the overflow based on a comparison of the time information and a count value counted by the clocking unit.

When the occurrence of an overflow is predicted as a result of conducting advance prediction for overflows using time information and a count value of an internal clock, this structure allows for the reading and deleting of information from a buffer to be expedited so as to normalize the amount of information accumulating in the buffer, by either shortening the predetermined playback duration of frames that a viewer is unlikely to notice even when played irregularly or suppressing playback of these frames. As a result, it is possible to play images or audio while reducing any deterioration in image/sound quality, even in cases of low PLL circuit performance or a low-cost structure that omits a PLL circuit.

Here, the prediction unit may calculate a differential between the count value and the time information, and predict that the overflow will occur if the differential is greater than or equal to a predetermined threshold.

When the occurrence of an overflow is predicted as a result of conducting advance prediction for overflows using a differential between time information and a count value of an internal clock, this structure allows for the reading and deleting of information from a buffer to be expedited so as to normalize the amount of information accumulating in the buffer, by either shortening the predetermined playback duration of frames that a viewer is unlikely to notice even when played irregularly or suppressing playback of these frames. As a result, it is possible to play images or audio while reducing any deterioration in image/sound quality, even in cases of low PLL circuit performance or a low-cost structure that omits a PLL circuit.

Here, the prediction unit may hold a first value and a second value, and whenever time information is acquired, may add "1" to the first value if the count value is greater than the time information, add "1" to the second value if the count value is smaller than the time information, and predict that the overflow will occur if the second value exceeds the first value by at least a predetermined threshold.

When the occurrence of an overflow is predicted as a result of conducting advance prediction for overflows based on a comparison of time information and a count value of an internal clock, this structure allows for the reading and deleting of information from a buffer to be expedited so as to normalize the amount of information accumulating in the buffer, by either shortening the predetermined playback duration of frames that a viewer is unlikely to notice even when played irregularly or suppressing playback of these frames. As a result, it is possible to play images or audio while reducing any deterioration in image/sound quality, even in cases of low PLL circuit performance or a low-cost structure that omits a PLL circuit.

Here, the prediction unit may predict that the overflow will occur if the amount of frame information accumulated in the buffer is greater than or equal to a predetermined upper limit.

When the occurrence of an overflow is predicted as a result of conducting advance prediction for overflows using the amount of frame information accumulated in a buffer, this structure allows for the reading and deleting of information from the buffer to be expedited so as to normalize the amount of information accumulating in the buffer, by either shortening the predetermined playback duration of frames that a viewer is unlikely to notice even when played irregularly or suppressing playback of these frames. As a result, it is possible to play images or audio while reducing any deterioration in image/sound quality, even in cases of low PLL circuit performance or a low-cost structure that omits a PLL circuit.

Here, the frame information may be formed from image data, and the playback unit may play pieces of the frame information having a consecutive playback order, after adjusting a scheduled playback duration of each piece so as to reduce a difference in length between the scheduled playback durations, if the difference is equal to or greater than a predetermined length of time.

When, in relation to a plurality of pieces of frame information for consecutive playback, the difference in lengths between the scheduled playback durations of the frames is greater than or equal to a predetermined length of time, this structure allows for any unnaturalness felt by a viewer to be minimized by reducing the difference in lengths.

Here, the playback unit may commence playback of the selected frame information earlier than a predetermined playback starting time.

When the occurrence of an overflow is predicted as a result of conducting advance prediction for overflows, this structure allows for playback of target frame information to be conducted before a predetermined playback starting time rather than being suppressed. As a result, it is possible to play images or audio in a state of reduced deterioration in image/sound quality.

Here, the data stream may include program information formed from a program starting time and a program ending time, the data stream playback device may further include a clocking unit operable to count an internal clock, and an acquiring unit operable to acquire the program information from the data stream, and the selection unit may select, based on the internal clock and the program information, frame information from (i) frame information for playback at the program starting or ending time and (ii) a predetermined number of pieces of frame information for playback immediately before the program starting time or immediately after the program ending time.

When the occurrence of a buffer error is predicted as a result of conducting advance prediction for buffer errors, this structure allows for frames which have little affect on image/sound quality and are for playback at a time of switching between commercial messages (CMs) and programs, to be played without relying on a predetermined standard playback rate. As a result, it is possible to play images or audio while reducing any deterioration in image/sound quality, even in cases of low PLL circuit performance or a low-cost structure that omits a PLL circuit.

Here, the frame information may be formed from image data, and the selection unit may select frame information having a rate of change from a preceding piece of frame information that is less than a predetermined value.

When the occurrence of a buffer error is predicted as a result of conducting advance prediction for buffer errors, this structure allows for the amount of information accumulating in a buffer to be normalized by playing frames that have little change between individual pieces of image frame information and thus little affect on image/sound quality, without relying on a predetermined standard playback rate. As a result, it is possible to play images or audio while reducing any deterioration in image/sound quality, even in cases of low PLL circuit performance or a low-cost structure that omits a PLL circuit.

Here, the frame information may be formed from audio data, and the selection unit may select frame information whose playback volume level is less than or equal to a predetermined value.

When the occurrence of a buffer error is predicted as a result of conducting advance prediction for buffer errors, this structure allows for the amount of information accumulating in a buffer to be normalized by playing frames that express low-volume audio and are thus unlikely to be noticed by a viewer even when played irregularly, without relying on a predetermined standard playback rate. As a result, it is possible to play images or audio while reducing any deterioration in image/sound quality, even in cases of low PLL circuit performance or a low-cost structure that omits a PLL circuit.

Here, each piece of frame information may be formed from image data or audio data, and the selection unit may select frame information formed from image data that corresponds to frame information formed from audio data whose playback volume level is less than or equal to a predetermined value.

When the occurrence of a buffer error is predicted as a result of conducting advance prediction for buffer errors, this structure allows for synchronous playback of images and audio to be maintained, by playing frames that correspond to frames expressing low-volume audio without relying on a predetermined standard playback rate. As a result, it is possible to play images or audio while reducing any deterioration in image/sound quality, even in cases of low PLL circuit performance or a low-cost structure that omits a PLL circuit.

Here, the data stream may be encoded in accordance with an MPEG standard, the buffer error may be one of an underflow indicating a shortage of frame information accumulated in the buffer and an overflow indicating an excess of frame information accumulated in the buffer, and the selection unit may select frame information formed from an I-picture or a P-picture if an occurrence of the underflow is predicted, and select frame information formed from a B-picture if an occurrence of the overflow is predicted.

When the occurrence of a buffer error is predicted as a result of conducting advance prediction for buffer errors, this structure allows for the amount of information accumulating in a buffer to be normalized by selecting an I-picture or a P-picture, which have a higher image quality than B-pictures, when the occurrence of an underflow is predicted, and selecting a B-picture when the occurrence of an overflow is predicted, and by playing the selected frame information without relying on a predetermined standard playback rate. As a result, it is possible to play images or audio while reducing any deterioration in image/sound quality, even in cases of low PLL circuit performance or a low-cost structure that omits a PLL circuit.

Here, the data stream may be encoded in accordance with an MPEG standard, and include program information formed from a program starting time and a program ending time, the data stream playback device may further include a clocking unit operable to count an internal clock, and an acquiring unit operable to acquire the program information from the data stream, and the selection unit may (i) if the program starting or ending time is within the predetermined time period from when the occurrence of the buffer error is predicted, conduct a first selection whereby frame information is selected, based on the internal clock and the program information, from frame information for playback at the program starting or ending time and a predetermined number of pieces of frame information for playback immediately before the program starting time or immediately after the program ending time, (ii) if the first selection is not conducted, detect for frame information having a rate of change from a preceding piece of frame information that is less than a predetermined value, or frame information formed from audio data whose playback volume level is less than or equal to a predetermined value, and conduct, if a detection occurs, a second selection whereby the detected frame information is selected, and (iii) if the first and second selections are not conducted, select frame information formed from an I-picture or a P-picture if the predicted buffer error is an underflow indicating a shortage of frame information accumulated in the buffer, and elect frame information formed from a B-picture if the predicted buffer error is an overflow indicating an excess of frame information accumulated in the buffer.

When the occurrence of a buffer error is predicted as a result of conducting advance prediction for buffer errors, this structure allows for the amount of information accumulating in a buffer to be normalized by playing frames that a viewer is unlikely to notice, even when played irregularly, without relying on a predetermined standard playback rate. As a result, it is possible to play images or audio while reducing any deterioration in image/sound quality, even in cases of low PLL circuit performance or a low-cost structure that omits a PLL circuit.

A data stream playback method pertaining to the present invention, which is for receiving a data stream that includes frame information, accumulating the frame information in a buffer, and reading from the buffer and playing the frame information, includes the steps of: conducting prediction for a buffer error relating to an amount of frame information accumulated in the buffer; selecting, within a predetermined time period starting from when an occurrence of the buffer error is predicted, frame information, accumulated in the buffer, that satisfies a predetermined condition; and playing the selected frame information using a playback rate different from a predetermined standard playback rate.

When the occurrence of a buffer error is predicted as a result of conducting advance prediction for buffer errors, this structure allows for the amount of information accumulating in a buffer to be normalized by playing frames that a viewer is unlikely to notice, even when played irregularly, without relying on a predetermined standard playback rate. As a result, it is possible to play images or audio while reducing any deterioration in image/sound quality, even in cases of low PLL circuit performance or a low-cost structure that omits a PLL circuit.

A computer program pertaining to the present invention, which is applied in a data stream playback device for receiving a data stream that includes frame information, accumulating the frame information in a buffer, and reading from the buffer and playing the frame information, has a computer execute the steps of: conducting prediction for a buffer error relating to an amount of frame information accumulated in the buffer; selecting, within a predetermined time period starting from when an occurrence of the buffer error is predicted, frame information, accumulated in the buffer, that satisfies a predetermined condition; and playing the selected frame information using a playback rate different from a predetermined standard playback rate.

When the occurrence of a buffer error is predicted as a result of conducting advance prediction for buffer errors, this structure allows for the amount of information accumulating in a buffer to be normalized by playing frames that a viewer is unlikely to notice, even when played irregularly, without relying on a predetermined standard playback rate. As a result, it is possible to play images or audio while reducing any deterioration in image/sound quality, even in cases of low PLL circuit performance or a low-cost structure that omits a PLL circuit.

A digital broadcast receiver pertaining to the present invention includes the above data stream playback device.

When the occurrence of a buffer error is predicted as a result of conducting advance prediction for buffer errors, this structure allows for the amount of information accumulating in a buffer to be normalized by playing frames that a viewer is unlikely to notice, even when played irregularly, without relying on a predetermined standard playback rate. As a result, it is possible to play images or audio while reducing any deterioration in image/sound quality, even in cases of low PLL circuit performance or a low-cost structure that omits a PLL circuit.

A digital broadcast receiver pertaining to the present invention implements the above data stream playback method.

When the occurrence of a buffer error is predicted as a result of conducting advance prediction for buffer errors, this structure allows for the amount of information accumulating in a buffer to be normalized by playing frames that a viewer is unlikely to notice, even when played irregularly, without relying on a predetermined standard playback rate. As a result, it is possible to play images or audio while reducing any deterioration in image/sound quality, even in cases of low PLL circuit performance or a low-cost structure that omits a PLL circuit.

A digital broadcast receiver pertaining to the present invention executes the above computer program.

When the occurrence of a buffer error is predicted as a result of conducting advance prediction for buffer errors, this structure allows for the amount of information accumulating in a buffer to be normalized by playing frames that a viewer is unlikely to notice, even when played irregularly, without relying on a predetermined standard playback rate. As a result, it is possible to play images or audio while reducing any deterioration in image/sound quality, even in cases of low PLL circuit performance or a low-cost structure that omits a PLL circuit.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 5 is a flowchart of frame selection processing operations that combine four frame selection methods;

FIGS. 6A & 6B show an overview of frame playback timing when the occurrence of a buffer error is predicted;

FIGS. 8A & 8B show an overview of frame playback timing when there is an overflow prediction.

DETAILED DESCRIPTION OF THE PREFERRED EMBODIMENTS

A data stream playback device according to an embodiment of the present invention is described below with reference to the drawings.

1. Synopsis

Figure 1:
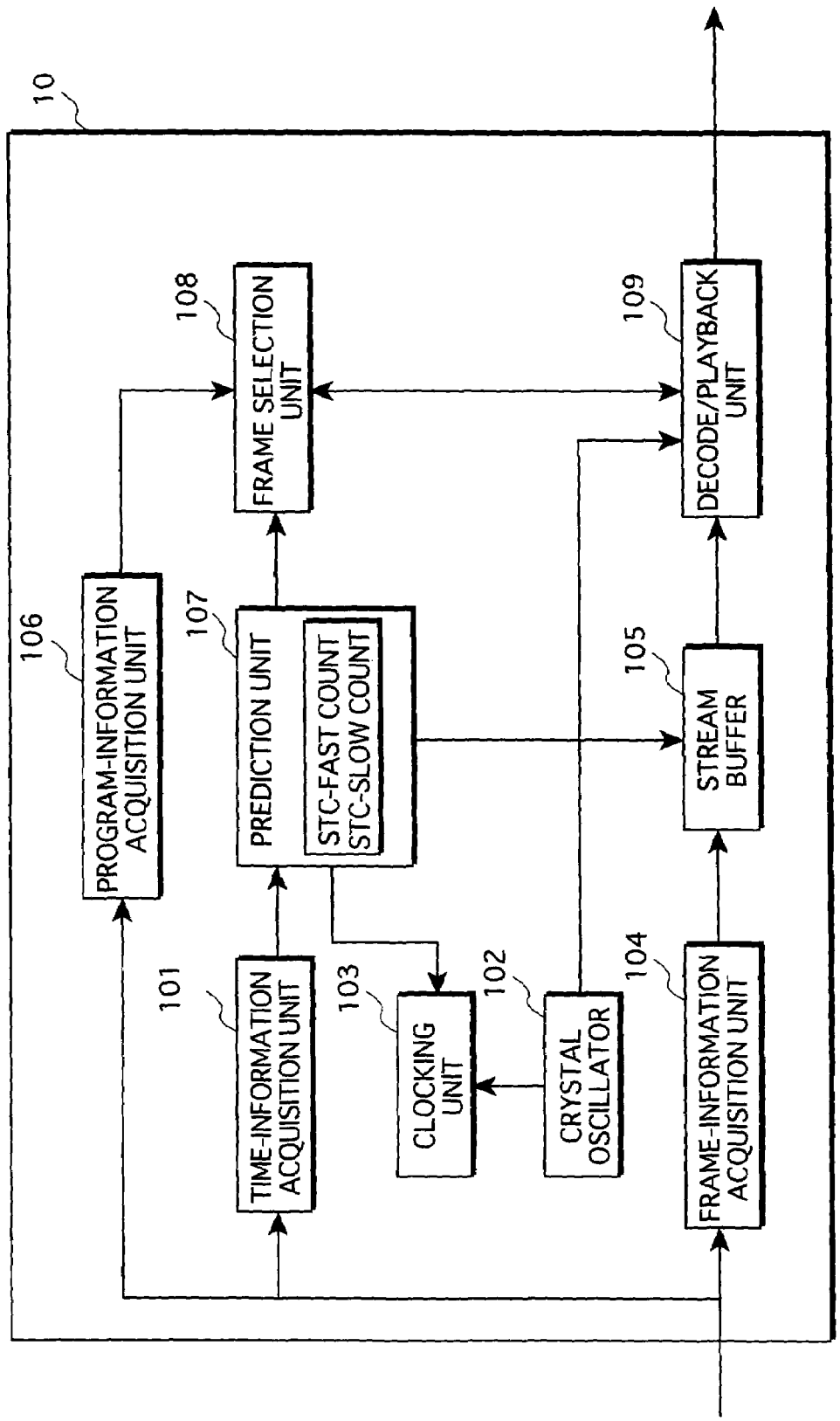
FIG. 1 is a block diagram showing an overall structure of a data stream playback device 10.

FIG. 1 is a block diagram showing the overall structure of a data stream playback device 10.

Data stream playback device 10 (hereinafter "playback device 10") is realized specifically by software and hardware such as a processor, a ROM (read only memory) storing a computer program, and a working RAM (random access memory). Functions performed by the compositional elements of playback device 10 are realized by the processor executing the computer program stored in ROM. Transfer of data between the various elements is conducted via hardware such as RAM.

Data streams are inputted into playback device 10 as transport streams (TSs) that result from the conversion of video programs created by a broadcast station into digital data using a predetermined format. A data stream includes frame information relating to encoded image and audio frames, program information including program names and starting/ending times of individual video programs, and time information such as program clock references (PCRs).

A time-information acquisition unit 101, a frame-information acquisition unit 104, and a program-information acquisition unit 106 respectively acquire the time information, the frame information, and the program information from inputted transport streams.

Frame-information acquisition unit 104 accumulates acquired frame information in a stream buffer 105.

A prediction unit 107 predicts underflows and overflows (i.e. buffer errors) in stream buffer 105, based on the amount of frame information accumulated in stream buffer 105, PCRs acquired from time-information acquisition unit 101, and a system time clock (STC) acquired from a clocking unit 103. Unit 107 notifies prediction results to a frame selection unit 108.

Here, an underflow indicates a data shortage in stream buffer 105 whereby the amount of held data is less than or equal to a predetermined lower limit. An overflow indicates a data excess in stream buffer 105 whereby the amount of held data is greater than or equal to a predetermined upper limit.

When prediction unit 107 predicts the occurrence of one of the above buffer errors, frame selection unit 108 selects a frame (hereinafter "target frame") for playback at a playback rate that is different from a predetermined standard playback rate in order to avoid actually causing the buffer error in stream buffer 105.

A decode/playback unit 109 prevents buffer errors from occurring by playing a target frame at a different playback rate from a predetermined standard playback rate.

2. Structure

Time-information acquisition unit 101 monitors PCRs appended intermittently to a transport stream, acquires the PCRs, and outputs the value of acquired PCRs to prediction unit 107.

A crystal oscillator 102 generates a clock having a 27 MHz frequency, and outputs the generated clock to clocking unit 103.

Here, the clock generated by crystal oscillator 102 has a worst case error of ±200 ppm (parts per million).

Clocking unit 103 includes a clock for keeping the present time, and a counter for incrementing the STC in sync with the clock inputted from crystal oscillator 102. The STC is a reference time used by decode/playback unit 109 in the decoding and playback of image and audio frames.

Prediction unit 107 refers to the present time and count value clocked by clocking unit 103 as required.

Frame-information acquisition unit 104 acquires frame information from transport streams, and outputs the acquired frame information to stream buffer 105.

Here, the input rate of frame information to stream buffer 105 is 384 kbps (kilobits per second).

Stream buffer 105 has a 1 MB (megabyte) capacity and includes a 10 KB (kilobyte) margin capacity. Unit 105 temporarily holds frame information until decode/playback unit 109 plays the held frame information.

The margin capacity is surplus memory capacity available to prevent overflows and underflows from occurring for approximately 17 minutes, given a ±200 ppm worst case error for crystal oscillator 102.

Data is inputted into stream buffer 105 at a rate of 384 kbps, irrespective of the frequency of the clock generated by crystal oscillator 102, while data is outputted from stream buffer 105 in accordance with the clock generated by crystal oscillator 102.

For example, in the case of crystal oscillator 102 having a +200 ppm error, the output rate from stream buffer 105 will be 384.0768 kbps, meaning that 0.0768 KB of excess data is outputted per second.

A 10 KB margin capacity thus equates to approximately 17 minutes worth of excess data.

Program-information acquisition unit 106 acquires program information from inputted transport streams and holds the acquired program information.

Prediction unit 107 holds a "used amount" (i.e. amount of data accumulated in the buffer) of stream buffer 105 as buffer information, and predicts underflows and overflows in stream buffer 105 using the buffer information or PCR/STC values. If the occurrence of a buffer error is predicted, unit 107 outputs prediction information to frame selection unit 108 showing whether the prediction relates to an underflow or an overflow.

In the present embodiment, prediction unit 107 is used in combination with three types of buffer-error prediction methods. It is however possible to use only one or two of the methods, rather than all of the methods.

These three buffer-error prediction methods are described below.

In the first method, prediction unit 107 predicts buffer errors using the used amount of stream buffer 105.

Figure 2:
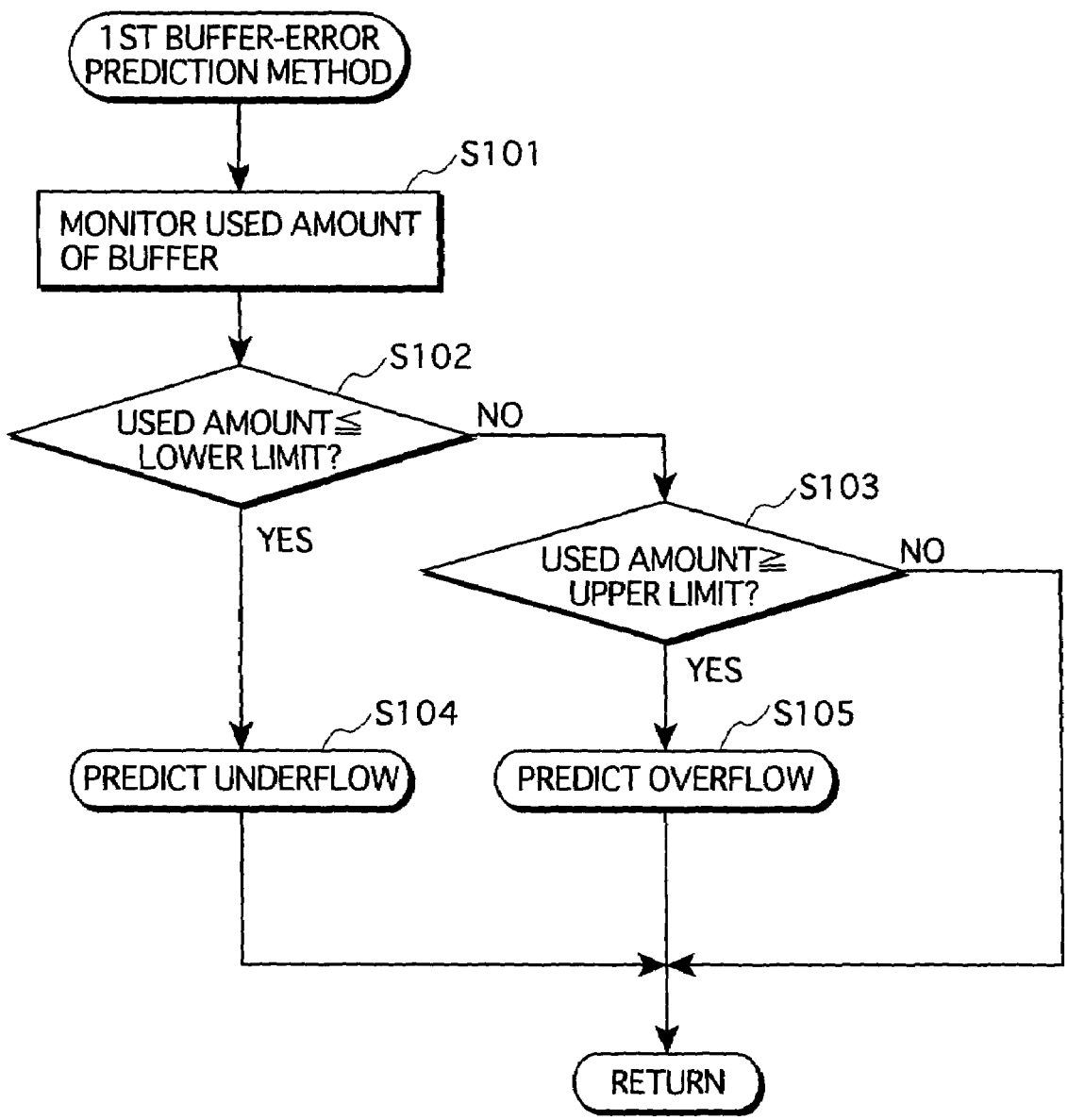
FIG. 2 is a flowchart showing operations relating to a first buffer-error prediction method.

FIG. 2 is a flowchart showing operations relating to the first method.

Prediction unit 107 regularly monitors the used amount in stream buffer 105 (S101).

If the used amount is less than or equal to the predetermined lower limit of 10 KB (S102=YES), prediction unit 107 predicts that an underflow will occur, and if the used amount is greater than or equal to the predetermined upper limit of 0.99 MB (S103=YES), unit 107 predicts that an overflow will occur.

If an underflow is predicted, prediction unit 107 outputs prediction information to frame selection unit 108 showing an underflow prediction (S104), and if an overflow is predicted, unit 107 outputs prediction information to frame selection unit 108 showing an overflow prediction (S105).

The second buffer-error prediction method involves conducting prediction every time a PCR is inputted, using a differential between the inputted PCR and the STC.

Figure 3:
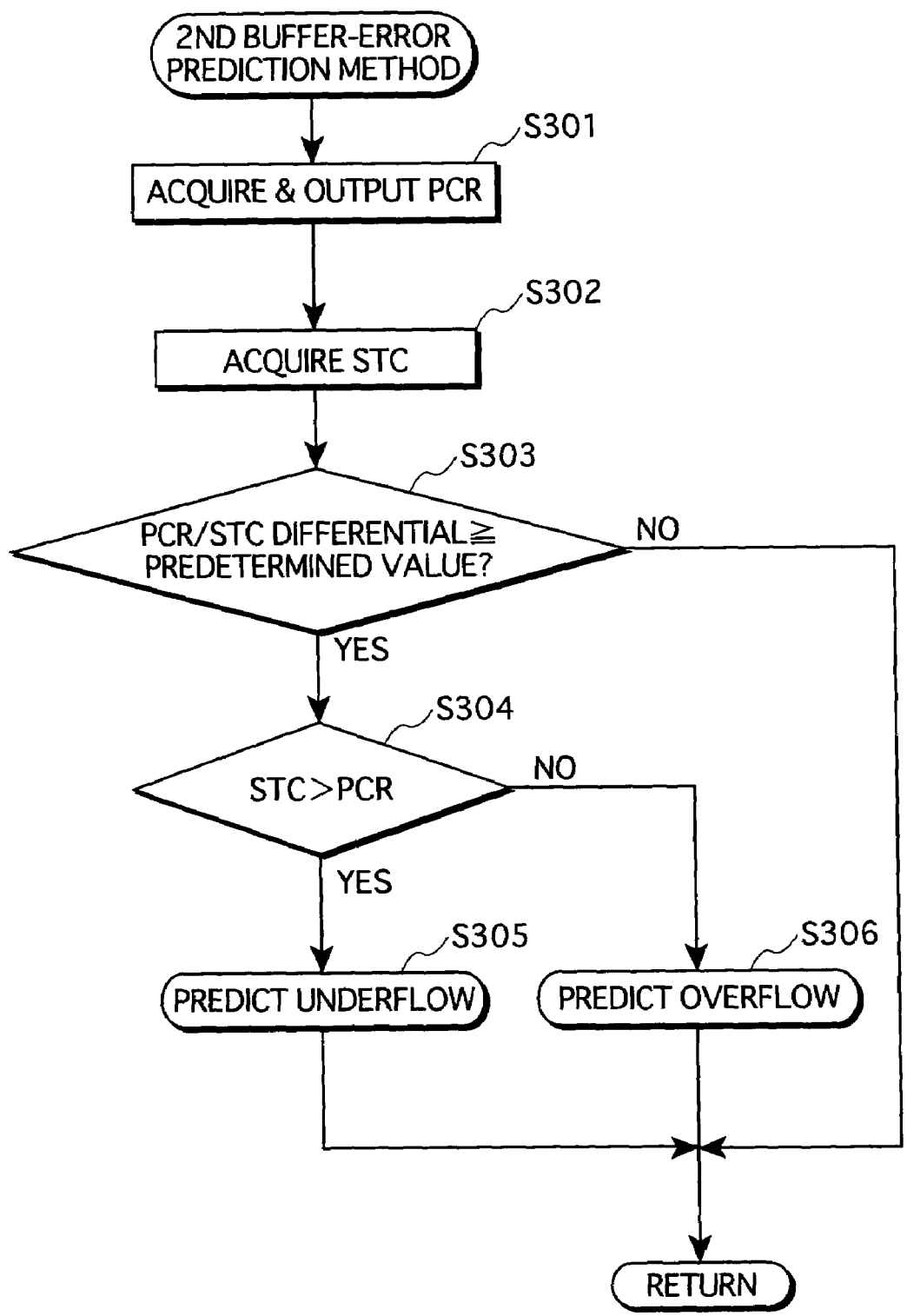
FIG. 3 is a flowchart showing operations relating to a second buffer-error prediction method.

FIG. 3 is a flowchart showing operations relating to the second method.

Time-information acquisition unit 101 acquires a PCR included in an inputted transport stream, and outputs the value of the acquired PCR to prediction unit 107 (S301).

Prediction unit 107 acquires an STC value measured by clocking unit 103 (S302).

Prediction unit 107 compares the PCR value with the STC value (S303), and if the differential of the two values is less than a count value that equates to the predetermined value of 10 KB (S303=NO), unit 107 ends the processing. If the differential is greater than or equal to the predetermined value (S303=YES), unit 107 compares the sizes of the two values (S304).

If the STC is larger than the PCR (S304=YES), prediction unit 107 predicts that an underflow will occur, and if the STC is smaller than the PCR (S304=NO), unit 107 predicts that an overflow will occur.

If an underflow is predicted, prediction unit 107 outputs prediction information to frame selection unit 108 showing an underflow prediction (S305), and if an overflow is predicted, unit 107 outputs prediction information to unit 108 showing an overflow prediction (S306).

Here, the second method is conducted every time time-information acquisition unit 101 acquires a PCR.

In the third buffer-error prediction method, prediction unit 107 compares PCR and STC sizes every time a PCR is inputted, counts the number of times that the STC is respectively larger or smaller than the PCR, and uses these count values to predicts buffer errors.

Figure 4:
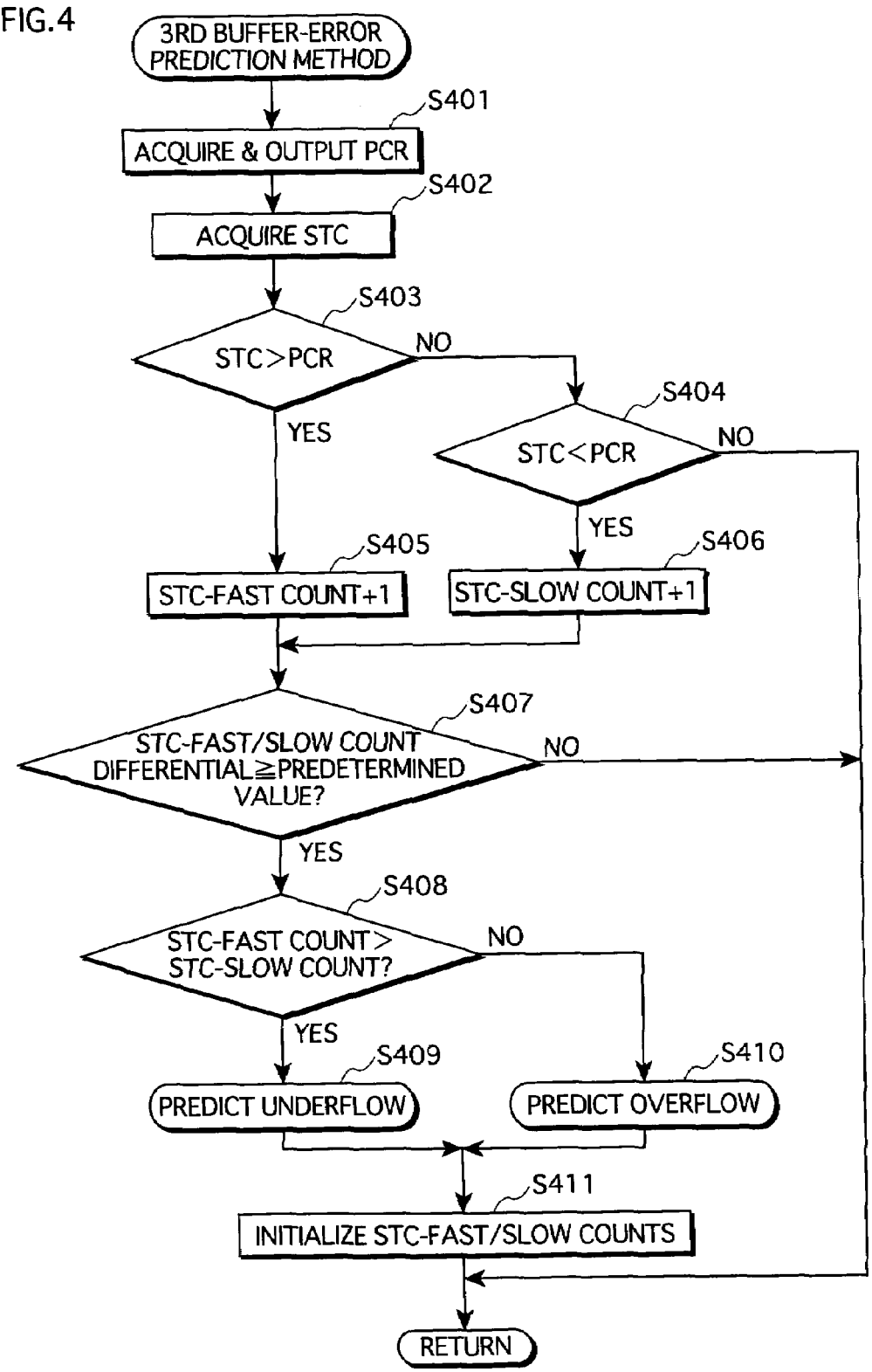
FIG. 4 is a flowchart showing operations relating to a third buffer-error prediction method.

FIG. 4 is a flowchart showing operations relating to the third method.

Time-information acquisition unit 101 acquires a PCR, and outputs the PCR value to prediction unit 107 (S401).

Prediction unit 107 acquires an STC value from clocking unit 103 (S402).

Prediction unit 107 compares the PCR value with the STC value (S403, S404). If the STC value is larger (S403=YES), unit 107 adds "1" to an STC-fast count value (S405), and if the STC value is smaller (S404=YES), unit 107 adds "1" to an STC-slow count value (S406).

If the PCR value matches the STC value (S404=NO), prediction unit 107 ends the processing.

Prediction unit 107 judges whether the differential between the STC-fast count value and the STC-slow count value is greater than or equal to a predetermined value (S407), and if the differential is less than the predetermined value (S407=NO), unit 107 ends the processing.

If the differential is greater than or equal to the predetermined value (S407=YES), prediction unit 107 compares the sizes of the two count values (S408). If the STC-fast count value is larger than the STC-slow count value (S408=YES), unit 107 predicts that an underflow will occur, and if the STC-fast count value is smaller than the STC-slow count value (S408=NO), unit 107 predicts that an overflow will occur.

If an underflow is predicted, prediction unit 107 outputs prediction information to frame selection unit 108 showing an underflow prediction (S409), and if an overflow is predicted, unit 107 outputs prediction information to frame selection unit 108 showing an overflow prediction (S410).

If either of these buffer errors is predicted, prediction unit 107 sets both the STC-fast count and STC-slow count values to "0" (S411).

Prediction unit 107 outputs prediction information to frame selection unit 108 if a buffer error is predicted using any of the first to third buffer-error prediction methods.

Frame selection unit 108 selects frame information (hereinafter "target frame information") depending on whether the prediction information inputted from prediction unit 107 is an underflow or overflow prediction. The selection is made either from frame information already held in stream buffer 105, or from frame information that will accumulate within a predetermined time period.

Frame selection unit 108 selects frame information relating to frames that satisfy any of the following criteria: (i) frames that will not adversely affect image or sound quality even if played irregularly, examples of which include frames having extremely low volume levels and lots of blackout in the video, and frames to be played in the switch between programs and commercial messages (CMs); (ii) frames that will not adversely affect image or sound quality even if the video freezes, due to there being little or no movement in the video; (iii) frames that will not adversely affect image or sound quality even if played irregularly, due to having extremely low volume levels.

In the present embodiment, four methods of selecting target frame information are used.

These four frame selection methods are described below.

The first method involves selecting a frame to be played at a time of switching from a CM to a program or vice versa.

Frame selection unit 108 judges, based on the date-time kept by the clock in clocking unit 103 and the program information acquired by program-information acquisition unit 106, whether broadcast of the program starts or ends within 17 minutes (i.e. duration corresponding to the margin capacity) from the present time.

If judged in the affirmative, frame selection unit 108 waits until one second before the starting or ending time of the program; that is, unit 108 waits for frame information for playback in a vicinity of the starting or ending time to accumulate in stream buffer 105.

Here, the wait period is not limited to one second, and is assumed to be variable depending on the capacity of stream buffer 105, for example.

Frame selection unit 108 selects, as target frame information, frame information that is for playback in a vicinity of frame information to be played at the program starting or ending time, using PTSs relating to frame information in the buffer.

Frame selection unit 108 outputs the target frame information and the prediction information to decode/playback unit 109.

Here, if the program information includes the starting or ending time of a CM in addition to the starting or ending time of a program, frame selection unit 108 may select, as target frame information, frame information for playback at the CM starting or ending time.

The second frame selection method involves selecting an audio frame that expresses audio having an extremely low volume level.

Frame selection unit 108 selects, as target frame information from frame information in stream buffer 105, audio frame information expressing audio whose volume level is less than or equal to a predetermined value. Unit 108 outputs the target frame information and the prediction information to decode/playback unit 109.

In the case of audio frames expressing audio whose volume level is less than or equal to a predetermined value being selected as target frame information, frame selection unit 108 may also select, as target frame information, image frame information to be played in combination with this audio frame information, so as to maintain the sync playback of audio and image frame information.

The third frame selection method involves selecting a target frame from frames for consecutive playback that have gently moving images. Frame selection unit 108 selects, as a target frame, an image frame whose rate of change from a preceding image frame is smaller than a predetermined value. Unit 108 outputs target frame information expressing this target frame to decode/playback unit 109, together with the prediction information.

The fourth frame selection method involves selecting a B-picture or one or an I-picture and a P-picture, depending on the prediction information.

Consecutive image frames held by stream buffer 105 are encoded according to MPEG standards. Each image frame is one of a B-picture, I-picture, or P-picture. If prediction information inputted from prediction unit 107 is an overflow prediction, frame selection unit 108 selects a B-picture as a target frame, and if inputted prediction information is an underflow prediction, unit 108 select either an I-picture or a P-picture as a target frame.

Target frame information expressing a selected target frame and prediction information inputted from prediction unit 107 are outputted to decode/playback unit 109.

To explain a little more about B-pictures, I-pictures and P-pictures, in bi-directional prediction encoding according to MPEG, B-pictures, which are not used in prediction, are processed roughly, while I-pictures and P-pictures are processed so as to maintain high image quality. As such, B-pictures are selected according to the fourth frame selection method as image frames whose playback can be omitted, while I-pictures and P-pictures are selected as image frames to be played for a different duration from a predetermined duration.

FIG. 5 is a flowchart of frame selection processing operations that combine the above four frame selection methods.

Frame selection unit 108 receives prediction information from prediction unit 107 (S601).

Frame selection unit 108 acquires the present time from clocking unit 103, and program information from program-information acquisition unit 106 (S602).

Frame selection unit 108 judges whether the broadcast starting time or ending time of a program is within 17 minutes (i.e. predetermined duration corresponding to the margin capacity) from the present time (S603).

If judged in the affirmative (S603=YES), frame selection unit 108 waits for frame information that is to be played in a vicinity of the program starting or ending time to accumulate in stream buffer 105 (S604).

Here, frame selection unit 108 waits at step S604 until one second before the starting or ending time. Unit 108 selects, as target frame information from frame information in the buffer, frame information for playback immediately before the program starting time or immediately after the program ending time (S605).

Frame selection unit 108 notifies a selected target frame to decode/playback unit 109 (S606).

If judged in the negative at step S603 (S603=NO), frame selection unit 108 judges whether there is an audio frame in the buffer whose volume level is lower than a predetermined volume level (S607).

If judged in the affirmative (S607=YES), frame selection unit 108 selects this audio frame as a target frame (S608), and executes step S606. If judged in the negative (S607=NO), unit 108 judges whether there is an image frame whose movement (i.e. rate of change) between images from a preceding image frame is less than or equal to a predetermined amount of movement (S609).

If judged in the affirmative (S609=YES), frame selection unit 108 selects this image frame as a target frame (S610), and executes step S606.

If judged in the negative (S609=NO), frame selection unit 108 judges whether 17 minutes has elapsed since receiving the prediction information (S611).

If judged in the negative (S611=NO), frame selection unit 108 returns to step S607 to continue the processing.

If judged in the affirmative (S611=YES), frame selection unit 108 judges whether the prediction information shows an overflow (S612).

If judged in the affirmative (S612=YES), frame selection unit 108 selects a B-picture in the buffer having the longest playback duration as a target frame (S613), and executes step S606.

If judged in the negative (S612=NO; i.e. prediction information shows an underflow), frame selection unit 108 selects an arbitrary I-picture or P-picture in the buffer as a target frame (S613), and executes step S606.

In the present embodiment, all four of the frame selection methods are used in the frame selection processing. It is however possible to use only one of the four methods, or to combine two or three of the methods.

Decode/playback unit 109 determines the decoding order of frame information from the value of decoding time stamps (DTSS) included in frame information held temporarily in stream buffer 105, and decodes the frame information appropriately, according to the determined order.

Also, decode/playback unit 109 determines the playback order of frame information from the value of presentation time stamps (PTSs) included in the frame information, and plays the frame information appropriately, according to the determined order.

The playback rate is calculated using the PTS value of consecutive frames.

Decode/playback unit 109 either prohibits playback of the above target frame or plays this frame at a different playback rate from a predetermined standard playback rate. All other frames (i.e. all frames other than the target frame) are played at a predetermined standard playback rate.

A data stream playback device according to the present invention is, in addition to playing frames at a first playback rate intended on the side of the encoder, capable of playing frames, even at a second playback rate that is faster than the first playback rate.

Here, the playback rate intended on the encoder side is 15 fps.

The first playback rate is calculated from the PTS value of frames, as described above.

The viewer is less likely to notice screen flicker with frames played at the second playback rate than with frames played at the first playback rate.

For example, if the second playback rate is 30 fps, the viewer is less likely to notice screen flicker than with frames played at the first playback rate of 15 fps because of the shorter display duration per frame. Thus it would be preferable for the viewer to play image frames at 30 fps rather than 15 fps.

The frame playback method used by decode/playback unit 109 will differ depending on whether or not there is prediction information, and whether the prediction information is an underflow or overflow prediction.

First, operations when prediction information is not inputted into decode/playback unit 109 from frame selection unit 108 are described using FIGS. 6A and 6B.

Decode/playback unit 109, as described above, plays frames according to the first playback rate.

FIGS. 6A and 6B show an overview of frame playback timing when a buffer error is not predicted.

FIG. 6A shows playback device 10 playing frames at a playback rate of 15 fps.

F1 to F9 in FIG. 6A are frames for playback, these frames being played at a first playback rate of 15 fps.

FIG. 6B shows playback device 10 playing frames at a second playback rate of 30 fps.

In this case, each of frames F1 to F9 is played twice.

As described above, the viewer is less likely to notice screen flicker at the second playback rate than at the first playback rate.

Figure 7A:
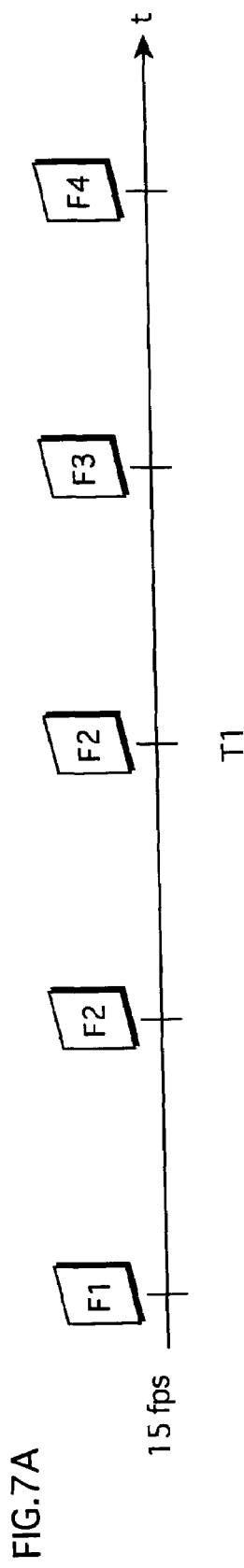
FIGS. 7A & 7B show an overview of frame playback timing when there is an underflow prediction.
Figure 7B:
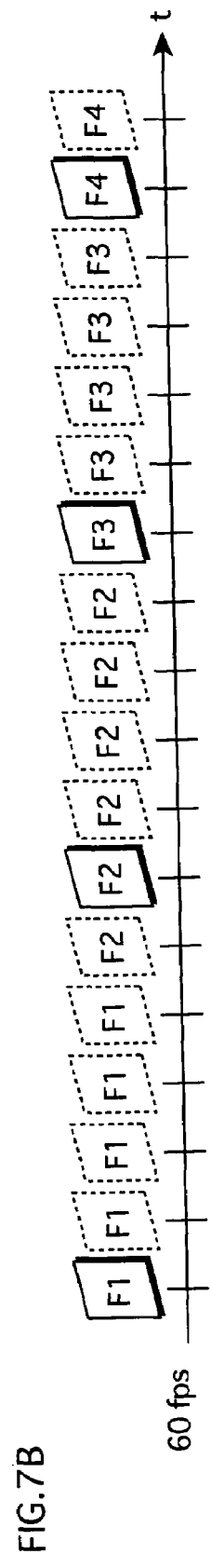

Next, operations when an underflow prediction is inputted as prediction information into decode/playback unit 109 from frame selection unit 108 are described using FIGS. 7A and 7B.

FIGS. 7A and 7B show an overview of frame playback timing when an underflow is predicted.

When the prediction information is an underflow prediction, this indicates there is a shortage of frame information that ought to be held in stream buffer 105 in order to playback frames, as a result of frame playback by decode/playback unit 109 being conducted at a faster timing than intended on the encoder side.

As such, decode/playback unit 109 resolves the frame information shortage in stream buffer 105 by extending the playback of a target frame beyond a predetermined duration.

FIG. 7A shows playback device 10 playing frames at the 15 fps playback rate intended on the encoder side.

If the target frame information is frame F2 in the case of the prediction information being an underflow prediction, frame F2 is played at time T1.

In this case, the playback rate in relation to frame F2 would appear to be 7.5 fps since the playback duration of this frame is twice that of other frames.

FIG. 7B shows playback by decode/playback unit 109 at a second playback rate of 60 fps, in contrast to the 15 fps first playback rate.

Here, the prediction information is an underflow prediction, and the target frame information is frame F2.

In this case, decode/playback unit 109 would, the same as in FIG. 7A, extend the playback of frame F2 before playing frame F3. However, according this playback method in which frames F1, F2 and F3 would be played four times, eight times and four times respectively, frame F2 end up being played many more times than the other frames, which increases the likelihood of the viewer noticing some unnaturalness.

As such, the number of playback frames for each of frames F1 to F3 is adjusted to be more uniform.

In FIG. 7B, decode/playback unit 109 adjusts frames F1, F2 and F3 to be played five, six and five times, respectively.

By lessening the differences in the playback lengths of frames, it is possible to reduce any unnaturalness felt by the viewer.

Next, operations when an overflow prediction is inputted as prediction information into decode/playback unit 109 from frame selection unit 108 are described using FIGS. 8A and 8B.

FIGS. 8A and 8B show an overview of frame playback timing when an overflow is predicted.

When the prediction information is an overflow prediction, this indicates there is an excess of frame information held in stream buffer 105 in order to playback frames, as a result of frame playback by decode/playback unit 109 being conducted at a slower timing than intended on the encoder side. Unit 109 is thus unable to playback all of the frames that ought to be played.

As such, decode/playback unit 109 resolves the frame information excess in stream buffer 105 by prohibiting the playback of a target frame or playing this frame for shorter than a predetermined duration.

FIG. 8A shows an example in which the first and second playback rates are both 15 fps, and the target frame information is frame F6.

At time T2 in FIG. 8A, playback of frame F6 is prohibited and frame F7 is played instead.

FIG. 8B shows an example in which the second playback rate is 30 fps in contrast the 15 fps first playback rate. The target frame information is frame F6.

Decode/playback unit 109 brings forward the playback starting time of frame F6 and plays this frame at time T3 instead of frame F5. Frame F7 is played at time T4. Decode/playback unit 109 reduces any unnaturalness felt by the viewer when frame F6 is not played by playing frame F6 rather than prohibiting its playback.

Also, it is possible to not playback frame F6 at time T3 by replacing frame F6 with frame F5.

3. Operations

Figure 9:
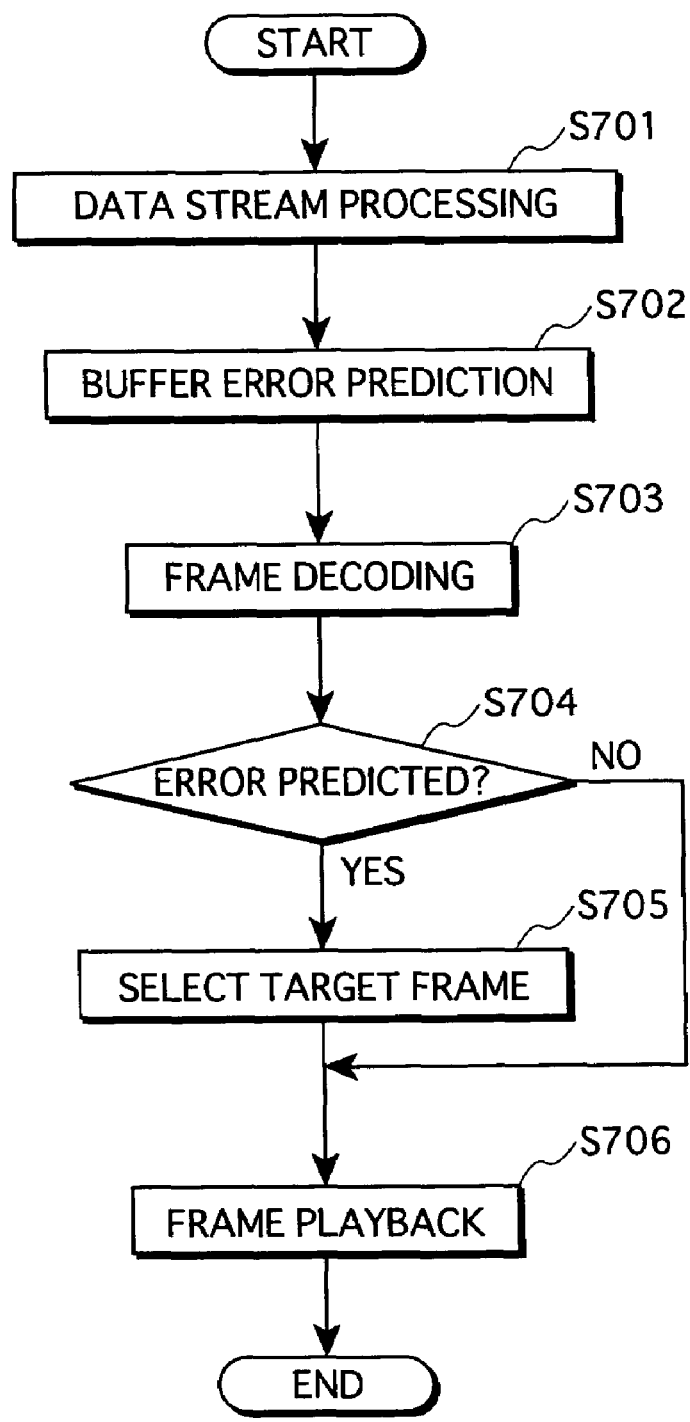
FIG. 9 is a flowchart showing an overview of the operations performed by data stream playback device 10.

FIG. 9 is a flowchart showing an overview of the operations performed by playback device 10.

Playback device 10 appropriately conducts the following data stream processing with respect to an inputted data stream (S701).

Clocking unit 103 counts the STC based on the clock outputted by crystal oscillator 102.

In relation to PCRs, frame information, and program information included in an inputted data stream: time-information acquisition unit 101 acquires the PCRs and outputs acquired PCRs to prediction unit 107; frame-information acquisition unit 104 acquires the frame information and accumulates acquired frame information in stream buffer 105; and program-information acquisition unit 106 acquires and holds the program information.

Prediction unit 107 conducts prediction for buffer errors (S702).

Decode/playback unit 109 decodes frame information held in stream buffer 105 (S703).

Frame selection unit 108 judges whether prediction unit 107 has predicted the occurrence of a buffer error (S704). If judged in the affirmative (S704=YES), unit 108 selects a target frame from frame information accumulated in the buffer (S705). Here, unit 108 waits for a target frame to accumulate in the buffer if it has not already done so. If judged in the negative (S704=NO), unit 108 proceeds to step S706.

Decode/playback unit 109 prohibits the playback of a target frame or plays this frame for a different duration from a predetermined duration. Unit 109 plays all other frames sequentially according to their respective playback durations (S706).

4. Summary

As described above, playback device 10, when a PLL circuit is not included, plays video and audio while reducing any deterioration in image or sound quality, by conducting advance prediction for overflows and underflows in a buffer, and prohibiting or conducting for a different duration from a predetermined duration, playback of frames that the viewer is unlikely to notice even if playback is omitted or conducted for a different duration.

5. Variations

Although description of the present invention has been based on the above embodiment, the present invention is, of course, not limited to this embodiment. The following cases are also included in the invention.

(1) Clocking unit 103 may, whenever time-information acquisition unit 101 acquires a PCR, set a value of the PCR in a counter.

(2) Buffer information outputted from stream buffer 105 to prediction unit 107 may be an unused amount rather than a used amount.

In this case, prediction unit 107 predicts that an overflow will occur when the unused amount is less than or equal to a predetermined lower limit, and predicts that an underflow will occur when the unused amount is greater than or equal to a predetermined upper limit.

(3) In the above embodiment, frame selection unit 108 selects frame information for playback immediately before a program starting time or immediately after a program ending time as target frame information. However, unit 108 may select frame information for playback at the program starting or ending time, or select from a few frames worth of frame information either side of the frame information for playback at the program starting or ending time.

(4) The various playback rates in the above embodiment were a playback rate of 15 fps intended on the encoder side, a first playback rate of 15 fps, and a second playback rate of 15 fps, 30 fps or 60 fps. However, these playback rates are not limited to 15 fps, 30 fps, and 60 fps, respectively, and may be arbitrary values.

(5) In the above embodiment, an example is given in which decode/playback unit 109 plays frames at a playback rate of two or four times the playback rate intended on the encoder side. However, unit 109 may play frames at a playback rate other than these rates.

(6) An inputted data stream is not limited to being a transport stream, and may be a program stream.

(7) The present invention is not limited to application in an MPEG-2 system, and may be applied in an MPEG-4 system.

(8) In the case of an event information table (EIT) being applied, a running status included in the EIT may be used in the first frame selection method to detect the start of programs.

Also, in the case of a running status table (RST) being applied, the RTS may be used to detect the start of programs.

(9) Although description of the present invention has related to a data stream playback device, the present invention may be a method for executing the above. The method may be a computer program realized by a computer, or a digital signal formed from the computer program.

The present invention may be a computer readable/writable recording medium that stores the computer program or digital signal, examples of which include a flexible disk, a hard disk, a CD-ROM, an MO, a DVD, DVD-ROM, a DVD-RAM, a BD (blu-ray disk), a semi-conductor memory, or the like. Also, the present invention may be the computer program or digital signal stored on any of these recording media.

The present invention may be a mechanism for transmitting the computer program or digital signal via a network or the like, representative examples of which include a telecommunication circuit, a wireless or cable communication circuit, and the Internet.

The present invention may be a computer system that includes a microprocessor and a memory, the memory storing the computer program and the microprocessor operating in accordance with the computer program.

Also, the computer program or digital signal may be conveyed to another independent computer system either via the network or by being recorded on the recording medium, and then implemented by the other computer system.

(10) The present invention may be any combination of the above embodiment and variations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data stream playback device for receiving a data stream that includes frame information, accumulating the frame information in a buffer, and reading from the buffer and playing the frame information, comprising:
    a prediction unit operable to conduct prediction for a buffer error relating to an amount of frame information accumulated in the buffer, and output prediction information indicating the buffer error;
    a selection unit operable to receive the prediction information, and select frame information, pertaining to a frame whose irregular playback has a smallest effect on playback characteristics of the data stream; and
    a playback unit operable to play the selected frame information using a playback rate different from a predetermined standard playback rate.

2. The data stream playback device of claim 1, wherein the data stream includes a plurality of PCRs (Program Clock References) as time information,
    the data stream playback device further comprises:
    a clocking unit operable to count an internal clock; and
    an acquiring unit operable to acquire the time information from the data stream, and
    the prediction unit predicts the occurrence of an underflow based on a comparison of the time information and a count value counted by the clocking unit.

3. The data stream playback device of claim 2, wherein the prediction unit calculates a differential between the count value and the time information, and predicts that the underflow will occur if the differential is greater than or equal to a predetermined threshold.

4. The data stream playback device of claim 2, wherein the prediction unit holds a first value and a second value, and whenever time information is acquired, adds "1" to the first value if the count value is greater than the time information, adds "1" to the second value if the count value is smaller than the time information, and predicts that the underflow will occur if the first value exceeds the second value by at least a predetermined threshold.

5. The data stream playback device of claim 1, wherein the prediction unit predicts that the underflow will occur if the amount of frame information accumulated in the buffer is less than or equal to a predetermined lower limit.

6. The data stream playback device of claim 1, wherein the frame information is formed from image data, and
    the playback unit plays pieces of frame information having a consecutive playback order, after adjusting a scheduled playback duration of each piece so as to reduce a difference in length between the scheduled playback durations, if the difference is equal to or greater than a predetermined length of time.

7. The data stream playback device of claim 6, wherein the data stream includes a plurality of PCRs (Program Clock References) as time information,
    the data stream playback device further comprises:
    a clocking unit operable to count an internal clock; and
    an acquiring unit operable to acquire the time information from the data stream, and
    the prediction unit predicts the occurrence of an overflow based on a comparison of the time information and a count value counted by the clocking unit.

8. The data stream playback device of claim 7, wherein the prediction unit calculates a differential between the count value and the time information, and predicts that the overflow will occur if the differential is greater than or equal to a predetermined threshold.

9. The data stream playback device of claim 8, wherein the prediction unit holds a first value and a second value, and whenever time information is acquired, adds "1" to the first value if the count value is greater than the time information, adds "1" to the second value if the count value is smaller than the time information, and predicts that the overflow will occur if the second value exceeds the first value by at least a predetermined threshold.

10. The data stream playback device of claim 1, wherein the prediction unit predicts that the overflow will occur if the amount of frame information accumulated in the buffer is greater than or equal to a predetermined upper limit.

11. The data stream playback device of claim 10, wherein the frame information is formed from image data, and
    the playback unit plays pieces of the frame information having a consecutive playback order, after adjusting a scheduled playback duration of each piece so as to reduce a difference in length between the scheduled playback durations, if the difference is equal to or greater than a predetermined length of time.

12. The data stream playback device of claim 1, wherein the playback unit commences playback of the selected frame information earlier than a predetermined playback starting time.

13. The data stream playback device of claim 1, wherein the data stream is a transport stream, and includes program information formed from a program starting time and a program ending time,
    the data stream playback device further comprises:
    a clocking unit operable to count an internal clock; and
    an acquiring unit operable to acquire the program information from the data stream, and
    the selection unit selects, based on the internal clock and the program information, frame information from (i) frame information for playback at the program starting or ending time and (ii) a predetermined number of pieces of frame information for playback immediately before the program starting time or immediately after the program ending time.

14. The data stream playback device of claim 1, wherein the frame information is formed from image data, and
    the selection unit selects frame information having a rate of change from a preceding piece of frame information that is less than a predetermined value.

15. The data stream playback device of claim 1, wherein the frame information is formed from audio data, and
    the selection unit selects frame information whose playback volume level is less than or equal to a predetermined value.

16. The data stream playback device of claim 1, wherein each piece of frame information is formed from image data or audio data, and
    the selection unit selects frame information formed from image data that corresponds to frame information formed from audio data whose playback volume level is less than or equal to a predetermined value.

17. The data stream playback device of claim 1, wherein the data stream is encoded in accordance with an MPEG standard, the buffer error is one of an underflow indicating a shortage of frame information accumulated in the buffer and an overflow indicating an excess of frame information accumulated in the buffer, and the selection unit selects frame information formed from an I-picture or a P-picture if an occurrence of the underflow is predicted, and selects frame information formed from a B-picture if an occurrence of the overflow is predicted.

18. The data stream playback device of claim 1, wherein the data stream is a transport stream, is encoded in accordance with an MPEG standard, and includes program information formed from a program starting time and a program ending time, the data stream playback device further comprises:

a clocking unit operable to count an internal clock; and an acquiring unit operable to acquire the program information from the data stream, and the selection unit (i) if the program starting or ending time is within the predetermined time period from when the occurrence of the buffer error is predicted, conducts a first selection whereby frame information is selected, based on the internal clock and the program information, from frame information for playback at the program starting or ending time and a predetermined number of pieces of frame information for playback immediately before the program starting time or immediately after the program ending time, (ii) if the first selection is not conducted, detects for frame information having a rate of change from a preceding piece of frame information that is less than a predetermined value, or frame information formed from audio data whose playback volume level is less than or equal to a predetermined value, and conducts, if a detection occurs, a second selection whereby the detected frame information is selected, and (iii) if the first and second selections are not conducted, selects frame information formed from an I-picture or a P-picture if the predicted buffer error is an underflow indicating a shortage of frame information accumulated in the buffer, and selects frame information formed from a B-picture if the predicted buffer error is an overflow indicating an excess of frame information accumulated in the buffer.

19. The data stream playback device of claim 1, wherein the predetermined standard playback rate includes playing each frame information at least two times.

20. The data stream playback device of claim 1, wherein when the prediction information indicates a buffer overflow, the playback unit still plays all of the frame information.

21. A data stream playback method for receiving a data stream that includes frame information, accumulating the frame information in a buffer, and reading from the buffer and playing the frame information, comprising the steps of:

conducting prediction for a buffer error relating to an amount of frame information accumulated in the buffer, and outputting prediction information indicating the buffer error;

receiving the prediction information, and selecting frame information, accumulated pertaining to a frame whose irregular playback has a smallest effect on playback characteristics of the data stream; and playing the selected frame information using a playback rate different from a predetermined standard playback rate.

22. A digital broadcast receiver that includes the data stream playback device of claim 1.

23. A digital broadcast receiver that implements the data stream playback method of claim 21 including a prediction unit to conduct prediction for a buffer error, a selection unit to receive the prediction information and select frame information, and a playback unit to play the selected frame information.

24. A data stream playback device for receiving a data stream that includes frame information, accumulating the frame information in a buffer, and reading from the buffer and playing the frame information, comprising:

a prediction unit operatively connected to the data stream provided to the buffer for determining an occurrence of buffer error relating to one of overflow of data into the buffer and underflow of data into the buffer and proving representative buffer error signals thereof;

a frame selection unit that receives the buffer error signal to select a specific frame where irregular playback has a smallest error effect on playback characteristics of the data stream; and a playback unit that plays the specific frame using a playback rate different from a predetermined standard playback rate wherein an improvement in reproduction quality is achieved.

* * * * *